Dec. 31, 1963 J. R. SINGER 3,116,463
FREQUENCY STABILIZATION SYSTEM
Filed May 27, 1960
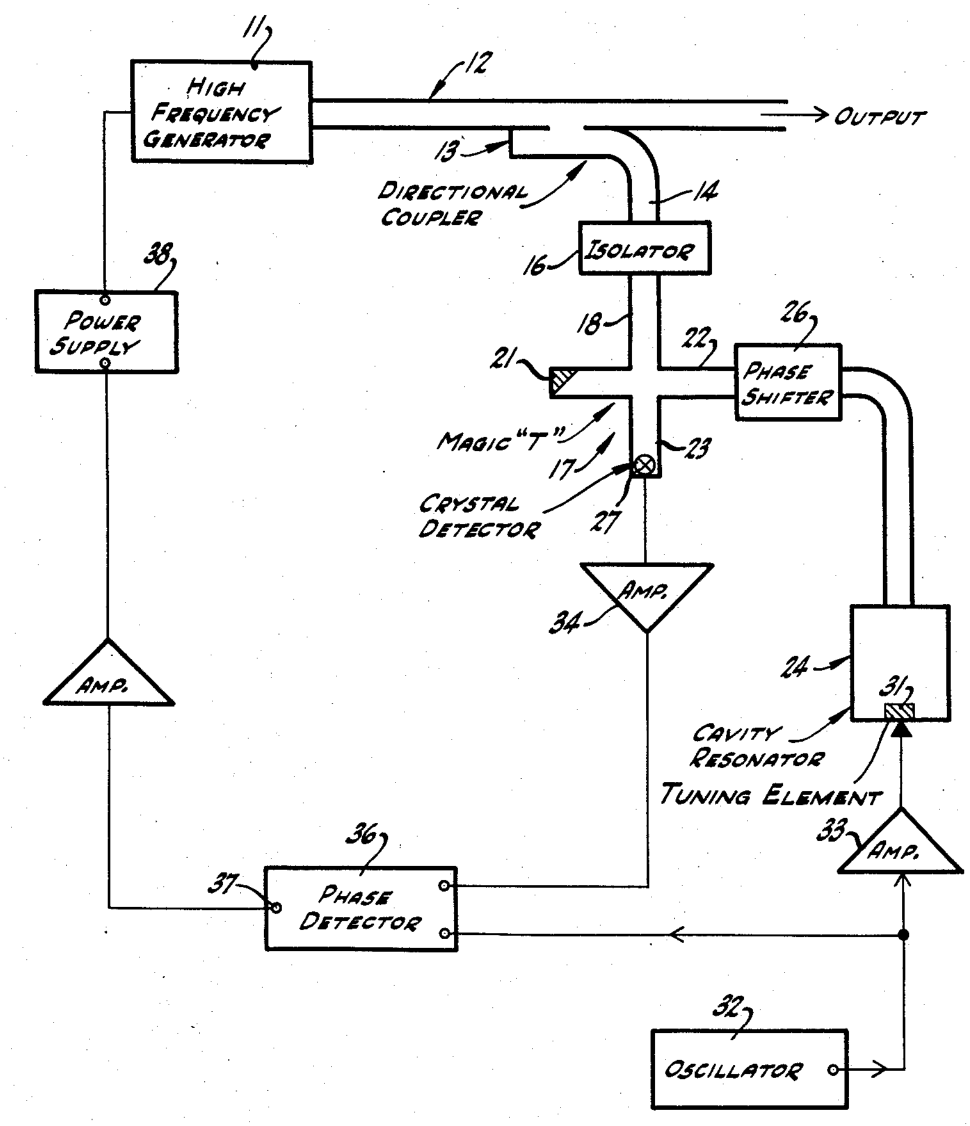
INVENTOR.
JEROME R. SINGER
BY
Lippincott, Ralls & Hendricson
ATTORNEYS

United States Patent Office 3,116,463
Patented Dec. 31, 1963

3,116,463
FREQUENCY STABILIZATION SYSTEM

Jerome R. Singer, Berkeley, Calif., assignor to The Regents of the University of California, Berkeley, Calif., a corporation of California Filed May 27, 1960, Ser. No. 32,157
1 Claim. (Cl. 331—9)

The present invention relates to automatic frequency stabilization for high-frequency generators and is particularly directed to the simplification of systems of this type and the improvement of frequency stabilization attainable therewith. The system of this invention is highly advantageous for use with generators operating in the kilomegacycle range, and the notation of high frequency is hereinafter employed to denote frequencies of this order.

It is well recognized that high-frequency generators such as klystrons, for example, require frequency stabilization in order to limit the drift of output frequency, and various devices and systems have been proposed and developed for accomplishing this regulation or stabilization. One of the early methods utilized in this respect included the provision of a low loss or high "Q" circuit which was energized by a portion of the high-frequency generator output to establish oscillations therein. As the generator output frequency varies from the resonant frequency of the high "Q" circuit, the output of the circuit will likewise vary and such may be taken as a measure of the change in frequency of the generator. This particular approach has also been modified to provide for the utilization of a pair of high "Q" circuits in order that the resultant control or indicating signal derived therefrom shall indicate the direction of frequency drift as well as the magnitude thereof. An alternative to the above-noted method is the provision of a tunable cavity which is energized by a portion of the output from a high-frequency generator and wherein the cyclic tuning of the resonant cavity produces an output signal therefrom indicative not only of the magnitude of frequency drift, but also the direction thereof.

Each of the prior-art approaches to the problem of automatic frequency control for high-frequency generators has certain limitations and difficulties, commonly in connection with the required complexity thereof. Certain other approaches are limited in the available frequency control therefrom, inasmuch as rapid frequency variations may go undetected and uncorrected. In order to achieve a truly accurate frequency stabilization, it is necessary for the stabilization or control signals to be generated in the time which is much shorter than the reciprocal of the highest harmonic of noise or the like present in the high-frequency generator. Thus in the instance wherein a klystron, for example, is operated from rectified alternating current, the highest noticeable harmonic of a ripple is generally somewhat less than 1000 cycles per second, and consequently, frequency stabilization should be operable in a period of the order of one millisecond. This substantially precludes the use of mechanical tuning means in the system.

The frequency stabilization system of this invention provides for the modulation of a small portion of the output from a high-frequency generator at a substantial frequency well in excess of that noted above, to thereby produce a signal which is detected and compared with the modulating signal in order to produce an error signal. This error signal or voltage is then employed to control the frequency of the high-frequency generator. In the instance wherein a klystron, or the like, is employed as the high-frequency generator, the error signal from the system thereof may be directly utilized to vary the klystron voltage, inasmuch as the output frequency is a function of such voltage. The desired rapidity of response of the stabilization system hereof is attained by the modulation of a portion of the high-frequency generator output at a substantial frequency. This is carried out in the present invention by the utilization of a resonant cavity which is modulated as to physical size by the energization of an element therein responsive to electrical stress to vary the physical proportions of such element. In particular, the present invention is directed to the utilization of a piezoelectric or magnetostrictive material in a resonant cavity for cyclically varying the physical dimensions thereof at the frequency of a voltage impressed upon such material. In this manner a modulation of a portion of the high-frequency generator output is attained, and through the utilization of suitable microwave circuitry there is produced and detected a signal which is compared as to phase with the energizing signal for the material. In direct contrast to certain prior-art systems, the comparison signal hereof is compared as to phase relationship with the modulating signal rather than with respect to amplitude of such comparison signal, In this manner the prior-art problems of tuning and maintaining circuit alinement are very materially reduced, if not entirely overcome.

It is an object of the present invention to provide a frequency stabilization system for a high-frequency generator having a response time which is less than the reciprocal of the highest harmonic present in the generator itself.

It is another object of the present invention to provide in a frequency stabilization system for a high-frequency generator, means for modulating a portion of the high-frequency output at a very substantial frequency through the utilization of a cavity resonator wherein the physical dimensions are rapidly changed by the application of a modulating signal.

It is a further object of the present invention to provide an improved frequency stabilization system for high-frequency generators producing an error signal from a phase comparison between a modulating signal driving a resonant cavity through a substantial range of resonant frequencies and a detected signal reflected from such cavity.

Various other advantages and possible objects of the present invention will become apparent to those skilled in the art from the following description of a single preferred embodiment of this invention; however, no limitation is intended by the terms of the description, and instead, reference is made to the appended claim for a precise delineation of the true scope of this invention.

The invention is illustrated as to a single, preferred embodiment thereof in the sole FIGURE of the drawing, wherein there is schematically illustrated a frequency stabilization system in accordance with this invention.

Considering now the present invention as to details and circuitry of a preferred embodiment thereof, and referring to the sole figure of the drawing, there will be seen to be provided a high-frequency microwave generator 11. This high-frequency generator may comprise any one of a relatively large variety of different types of devices; however, in the interests of simplicity same is herein considered to be a klystron producing an output in the megacycle range which is fed into an output waveguide 12. The output from the high-frequency generator 11 may be employed in a wide variety of applications and same is merely indicated at the right of the drawings by the notation "output." Immediately following the high-frequency generator in the waveguide 12, there is disposed a directional coupler 13 which may take any of a number of desired configurations such as, for example, the illustrated short slot coupling. A small proportion of the generator output is thus coupled from the output waveguide 12 through the coupler 13 and into a bypass line 14 which may, for example, include an isolator 16, if desired. The bypass line, or waveguide 14, is directed into a magic T junction 17 at a first arm 18 thereof. Inasmuch as the properties of magic T junctions are well known in the art, no detailed description thereof is herein included beyond the notation that energy or waves entering the arm 18 will be equally divided between the lateral arms 21 and 22 without coupling of any energy directly into the remaining arm 23. The arm 21 is terminated by a matched impedance load and the arm 22 extends into communication with a cavity resonator 24. It will be appreciated that with the cavity resonator 24 having a resonant frequency equal to the operating frequency of the generator 11, there will be reflected back toward the center of the junction through the arms 21 and 22 voltages of equal amplitudes and like phases. In the interests of insuring the desired phase relationship wherein the arm 22 is materially elongated, as illustrated, there may be provided a phase shifter 26 in this arm. Energy entering the magic T junction from the arms 21 and 22 will appear, in part, in the arm 23, and there is disposed therein a crystal detector 27 for detecting such energy.

In the instance wherein the cavity resonator 24 has the resonant frequency thereof equal to the operating frequency of the high frequency generator 11, and wherein the generator frequency has not drifted from the desired and expected value thereof, it will be seen that the arms 21 and 22 reflect in-phase voltages back to the center of the junction so that same reinforce in the detector arm 23 thereof. By suitable variation of the phase of either arm such as by means of the phase shifter 26, this relationship may be varied at will so that, for example, the reflected signals will cancel in the instance wherein the generator frequency is at desired value. As the generator frequency varies from a desired value, the input to the cavity resonator will no longer be at the resonant frequency of same, and consequently, a phase shift will occur wherein the signals reflected back into the center of the junction from the arms 21 and 22 of the magic T will be out-of-phase by an amount proportional to the amount of frequency shift of the original input signal from the generator. This has been appreciated by prior workers in the field and attempts have been made to regulate high-frequency generators by the signal appearing in the arm 23. Numerous difficulties are encountered in this respect, inasmuch as the value of this signal appearing in the other arm is dependent not only on frequency shift, but upon numerous other circuit factors. It is consequently necessary in this type of frequency regulation to guard very carefully against a wide variety of errors which may occur in the system, and which will prevent proper regulation unless overcome.

The present invention provides for the modulation of the physical size of the cavity resonator at a substantial frequency to sweep the resonant frequency thereof over a predetermined range. The generator output is applied to the resonator and reflections therefrom are detected for a subsequent comparison of this frequency with the modulating frequency to thereby produce an error signal from the phase difference therebetween. It is only by modulating the cavity resonator at a substantial frequency that accurate and precise frequency stabilization may be obtained, and thus the cavity resonator is herein modulated as to physical size by the utilization of a material which is responsive to applied electrical signals directly employed as electrical or magnetic forces for varying the physical size of same. There is illustrated in the drawings the disposition of a tuning element 31 in the cavity resonator and the application to this element of a signal from an oscillator 32 through an amplifier 33. This tuning element 31 comprises either a magnetostrictive or a piezoelectric material which varies in physical size with the application of electrical signals of substantial frequency. An alternating current signal is employed with magnetostrictive material. The oscillator 32 produces an output signal of substantial frequency as of the order of 100,000 cycles per second in the instance wherein the high-frequency generator is producing signals in the megacycle range. This energization of the tuning element 31 in the cavity resonator 24 will be seen to serve to vary the size and thus the resonant frequency of the resonator over a predetermined value, so that the input signal from the high-frequency generator will correspond to the resonant frequency of the cavity at some point in the frequency sweep therein. As a consequence of this resonant frequency variation of the cavity resonator, there will be reflected into the detecting arm 23 of the junction 17, a modulated signal which is detected at the crystal detector 27 therein. This detected signal will have a phase shifted relation to the output of the oscillator 32 driving the tuning element 31. The phase shift is proportional to the amount by which the high-frequency generator frequency varies from the normal desired value thereof, which is equal to the normal resonant frequency of the cavity resonator. The detected signal at the crystal 27 may be amplified by an amplifier 34, and is then supplied to a phase detector along with the driving signal from the oscillator 32. In the phase detector 36 a comparison is made between the signal from the crystal detector 27 and the output of the oscillator 32 driving the tuning element 31. From the phase difference detected between these signals there is produced an error signal at the output terminal 37 of the phase detector. This error signal is employed to control the output frequency of the high-frequency generator 11. In the instance wherein such generator constitutes a klystron or other voltage tunable device, the error signal may be directly applied to control the generator power supply 38 so as to vary the klystron frequency.

As an example of a frequency stabilization system of the present invention, there has been operated a system for the stabilization of a K band klystron (VA–96) wherein a Rochelle salt crystal was employed as the tuning element 31 in the cavity resonator. In this instance the resonant frequency of the cavity 24 was varied from 22.2 kilomegacycles to 24.2 kilomegacycles by the application of a 100 kc. driving signal from the oscillator 32. A 50 volt peak-to-peak signal was employed to energize the Rochelle crystal and the resultant frequency stability was determined to be of the order of 50 kc. which will be noted to be in the range of about one-quarter of one percent.

It will be seen from the above description of a preferred embodiment of the present invention that this invention provides an improved and simplified stabilization system for high-frequency generators. In particular, the present invention overcomes numerous prior-art problems associated with the original tuning of the system and also the extensive circuit complexity formerly required to obtain stabilization. Furthermore, the present invention provides a maximized stabilizing action inasmuch as the error signal hereof employed to control the frequency output is derived in a time which is substantially less than frequency excursions encountered in the generator. By the utilization of a substantial driving frequency of an intermediate frequency range for varying the physical dimensions of the cavity resonator hereof, it is possible to modulate a portion of the high-frequency generator ouput at a sufficient rate to achieve a truly practical and highly advantageous frequency stabilization. Certain portions of the system illustrated in the accompanying drawing will be seen to be optionally provided, such as for example, the isolator 16 and phase shifter 26, inasmuch as these elements, for example, serve only to improve operation under certain circumstances and are not basic to the invention. Thus the phase shifter may be employed to vary the mode of operation of the system to the extent that desired in-phase signals reflected from the arms 21 and 22 of the magic T may thus be obtained in order to energize the crystal detector 27 with a substantial signal energy. Additionally, the invention is equally applicable to all types of high-frequency generators with particular advantage for those operating in the megacycle range, inasmuch as conventional regulating systems are either inapplicable thereto or require such precision of alinement and complexity of circuitry as to seriously limit their utility in this range.

What is claimed is:

A frequency stabilization system for a high-frequency generator comprising a cavity resonator having a natural resonant frequency equal to the operating frequency of the generator, a tuning element within said cavity and responsive to electric signals for varying in physical size, an oscillator supplying an output of substantial frequency to said tuning element for sweeping the resonant frequency of said cavity through a range of values, a magic T junction having a pair of opposed arms connected one to said cavity and one to a matching impedance as well as two other arms, means coupling a part of the output of said generator into one of said other arms of said junction for energizing said cavity, a detector disposed in the remaining other arm of said junction for receiving reflected signals from said pair of opposed arms and producing a detected signal of the frequency of modulation of said generator output, a phase detector connected to said oscillator and detector and producing an error signal proportional to phase differences therebetween which is in turn proportional to the deviation in frequency of the generator output from said operating value, and means controlling the frequency of said generator by said error signal to maintain constant the generator output frequency.

References Cited in the file of this patent

UNITED STATES PATENTS

| | | |
|---|---|---|
| 2,404,568 | Dow | July 23, 1946 |
| 2,462,294 | Thompson | Feb. 22, 1949 |
| 2,564,005 | Halpern et al. | Aug. 14, 1951 |
| 2,770,729 | Dicke | Nov. 13, 1956 |

OTHER REFERENCES

Article by E. F. Grant in Proc. of I.R.E., August 1949, pages 943 to 951.